United States Patent
Taquino

(10) Patent No.: US 7,347,455 B1
(45) Date of Patent: Mar. 25, 2008

(54) RISER PROTECTOR

(76) Inventor: Weldon Taquino, 542 Bayview Dr., Cypremont Point, LA (US) 70508

( * ) Notice: Subject to any disclaimer, the term of this patent is extended or adjusted under 35 U.S.C. 154(b) by 303 days.

(21) Appl. No.: 11/121,696

(22) Filed: May 4, 2005

Related U.S. Application Data

(60) Provisional application No. 60/567,962, filed on May 4, 2004.

(51) Int. Cl.
*F16L 39/00* (2006.01)
*F16L 55/10* (2006.01)

(52) U.S. Cl. ............ 285/124.1; 285/901; 285/124.2; 285/124.3; 285/124.4; 138/89; 138/96 R

(58) Field of Classification Search ............ 138/89, 138/96 R; 285/901, 404, 90, 124.1–124.4; 166/92.1, 93.1, 94.1, 97.1, 75.13, 242.3
See application file for complete search history.

(56) References Cited

U.S. PATENT DOCUMENTS

| | | | | |
|---|---|---|---|---|
| 893,469 A | * | 7/1908 | Essmuller | 215/319 |
| 2,727,369 A | * | 12/1955 | Fawick | 464/72 |
| 3,018,829 A | * | 1/1962 | Maass | 166/85.2 |
| 3,280,908 A | * | 10/1966 | Todd | 166/340 |
| 3,606,074 A | * | 9/1971 | Hayes | 220/212 |
| 3,655,089 A | * | 4/1972 | Tower | 220/287 |
| 3,807,457 A | * | 4/1974 | Logsdon | 138/89 |
| 4,915,137 A | * | 4/1990 | Hall et al. | 138/96 R |
| 5,522,464 A | * | 6/1996 | Piper | 166/77.2 |
| 6,105,669 A | * | 8/2000 | Davis | 166/75.13 |
| 6,267,143 B1 | * | 7/2001 | Schick | 137/625.11 |
| 6,409,219 B1 | * | 6/2002 | Broome et al. | 285/3 |
| 6,748,975 B2 | * | 6/2004 | Hartshorne et al. | 137/625.46 |

* cited by examiner

*Primary Examiner*—Daniel P. Stodola
*Assistant Examiner*—Jay R Ripley
(74) *Attorney, Agent, or Firm*—Garvey, Smith, Nehrbass & North, L.L.C.; Charles C. Garvey, Jr.

(57) ABSTRACT

A piping riser protector for protectively covering the end portion of a riser assembly that includes a larger diameter central pipe and a plurality of smaller diameter peripheral pipes connected by a flange includes a polymeric body that protectively covers inner and outer surfaces of an end portion of the larger diameter pipe and provides enclosures that cover the exposed end portion of the smaller diameter pipe sections in between the end of each smaller diameter pipe section and the flange.

28 Claims, 4 Drawing Sheets

RISER PROTECTOR

CROSS-REFERENCE TO RELATED APPLICATIONS

Priority of U.S. Provisional Patent Application Ser. No. 60/567,962, filed May 4, 2004, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to protectors for the end portions of pipe assemblies or pipe bundles known or referred to as piping riser assemblies. More particularly, the present invention relates to an improved riser protector apparatus that can be used to protect end portions of riser assemblies that include a larger diameter central pipe and a plurality of smaller diameter pipes that are connected to and positioned generally parallel to and circumferentially spaced about the central larger diameter pipe, the protector being of a polymeric member that covers the inner bore and outer surface of an end portion of the larger diameter pipe and wherein a plurality of radially extending, circumferentially spaced covers with U shaped wall portions extend over and around an end portion of each of the plurality of smaller diameter pipes.

2. General Background of the Invention

Drilling for oil or natural gas in deep water requires the use of sophisticated buoyant risers. These risers typically contain a large inner pipe and smaller pipes attached to the larger pipe. Each riser section is installed offshore on a drilling vessel or platform. The connections between the smaller pipes are preferably a machine fit, being high tolerance connections that cannot be damaged. As you can imagine, each riser section is an expensive piece of equipment, and if the ends of the pipe get damaged, they cannot use that unit in the drill string.

Currently, protectors are in use that are made of steel. These prior art protectors cause major safety problems due to their weight. As a result, workers handling these protectors can be injured. Due to corrosion of the metal riser guards, as well as the denting that occurs from impacts, these guards have an extremely short service life.

BRIEF SUMMARY OF THE INVENTION

The present invention provides an improved riser protector that is constructed of light weight elastomers. The riser guard of the present invention is easier to install. Ease of installation creates a safer workplace. The present invention is constructed of a light weight material are used that virtually eliminates the chance for serious injury in the work place.

The present invention is an improvement on the overall protection of the riser ends. The elastomeric properties allow for energy absorption, which will resist impact much more efficiently. Current steel designs do not completely encapsulate the riser ends, which allows the exposed metal ends to corrode. The present invention provides an apparatus that closes the riser ends, minimizing corrosion. The elastomeric riser protector caps of the present invention can be reused since they are resistant to impact and corrosion. They can be constructed using material available in many colors, allowing for potential aids in alignments and installations.

The present invention provides a protector for a riser assembly that includes a plurality of pipe sections attached together to define a riser and a protector cover that is fitted to one end portion of the riser structure. The riser structure includes a central larger diameter pipe having an inner surface, an outer surface, and an open ended bore, a wall thickness and opposed ends. A plurality of smaller diameter peripheral pipes are provided each having an open ended bore. Flanges join the central larger and smaller peripheral pipes together to define a multi-pipe structure. Each of the flanges has a central opening occupied by the central larger diameter pipe and a plurality of circumferentially spaced apart peripheral openings that generally surround the central opening. At least some of the peripheral openings are occupies by a peripheral pipe, the structure having opposed end portions, one end portion being a pin end portion.

The present invention is in the form of a protective cover that is affixed to the central larger diameter pipe, the cover being a polymeric body that includes an inner cylindrical portion that occupies a part of the open ended bore and that is next to the inner surface, and an outer cylindrical portion that surrounds one of the opposed ends of the larger diameter pipe. A bead covers the pipe end and connects the inner and outer cylindrical portions of the polymeric body. A circular disk is connected to the inner cylindrical surface and occupies a position in the bore of the larger diameter pipe section, closing the bore.

The cover includes a plurality of radially extending enclosures that extend from the outer cylindrical portion to the periphery of the flanges. Each enclosure includes a longitudinally extending wall and a transversely extending wall that is connected to the longitudinally wall and to the outer cylindrical portion. Each enclosure provides an edge that is positioned next to a flange.

The polymeric body is preferably of a polyurethane material. Fasteners can be provided that connect the inner cylindrical portion to the inner surface of the large diameter pipe thus recessing the fasteners so that they are not easily damaged. The fasteners are preferably spaced circumferentially apart.

The inner cylindrical portion preferably provides multiple internal threaded openings. A fastener threadably attaches to the inner cylindrical portion at an internally threaded openings. The fasteners can be set screws (or bolts) that frictionally engage the inner surface of the larger diameter pipe.

The longitudinally extending wall can be generally U-shaped for each of the radially extending enclosures.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
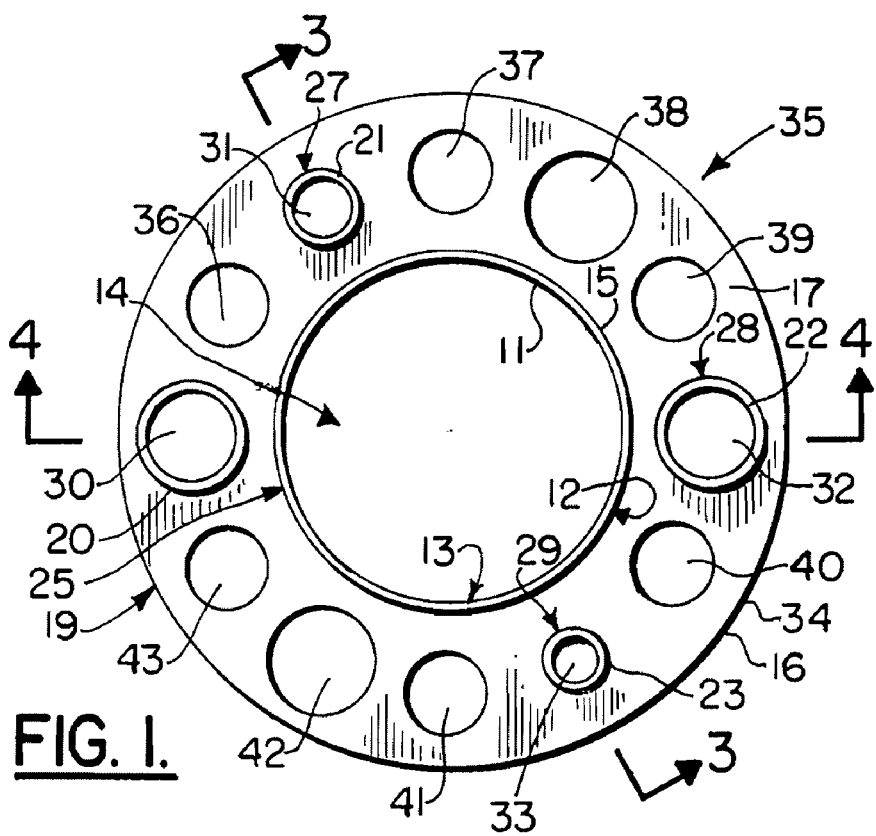
FIG. 1 is an end view of a typical riser assembly that includes a larger diameter central pipe section, a plurality of circumferentially spaced smaller diameter pipe sections and a flange that attaches to all of the pipe sections, holding them in a spaced apart, generally parallel configuration.

FIGS. 2, 5, 6, and 7 shown generally the preferred embodiment of the apparatus of the present invention designated generally by the numeral 10. Riser system 10 includes a central larger diameter pipe 11, a plurality of smaller diameter pipe sections or flow lines 20, 21, 22, 23, a circular flange 16, and a cover structure 50 that protectively covers an end portion of the central larger diameter pipe 11 and an end portion of each of the smaller diameter pipe sections 20, 21, 22, 23. Each pipe section 20, 21, 22, 23 has a high tolerance connection at its end portion 24 that cannot be damaged.

Central large diameter pipe section 11 has an outer surface 12, an inner surface 13 and an open ended bore 14. Wehn assembled for use at an oil platform, central larger diameter pipe section 11 has a pipe end 15 that is connected (during use) to a similarly configured end (not shown) of another central large diameter pipe section of a different riser structure. As defined herein, riser structure 34 is a known, prior art structure that includes central larger diameter pipe section 11, the plurality of smaller diameter pipe sections 20, 21, 22, 23 and flanges 16 that secure the pipe sections 11, 20, 21, 22, 23 together. While one end portion of a riser structure 34 shown in FIGS. 1, 3, 4 and 5, it should be understood that the opposing end portion is similarly configured, the overall riser structure 34 being well known. The end portion 35 of riser structure 34 shown in FIGS. 1, 3, 4 and 5 is known in the industry as the pin end portion. Flange 16 provides opposed flat face portion 17, 18 and annular peripheral surface 19.

Flange 16 provides a plurality of openings that enable a connection (for example, welded) to be made between the flange 16 and the various pipe sections 11, 20, 21, 22, 23.

Central opening 25 is receptive of central larger diameter section 11. Peripheral openings 26, 27, 28, 29 are receptive of the smaller diameter pipe sections 20, 21, 22, 23 respectively. Each of the smaller diameter pipe sections 20, 21, 22, 23 provides a central open ended bore. Pipe section 20 provides bore 30. Pipe section 21 provides bore 31. Pipe section 22 provides bore 32 and pipe section 23 provides bore 33. Circular flange 16 provides additional openings 36, 37, 38, 39, 40, 41, 42, 43. The openings 36, 37, 39, 40, 41 and 43 are bolt openings that enable bolted connections to be formed between the flange 16 of riser structure 34 and a similarly configured flange of another riser structure 34.

For lifting the entire riser structure 34, lift openings 38, 42 are provided. The openings 38, 42 can be of a slightly larger diameter than the openings 36, 37, 39, 40, 41, 43 that are bolt openings.

Figure 2:
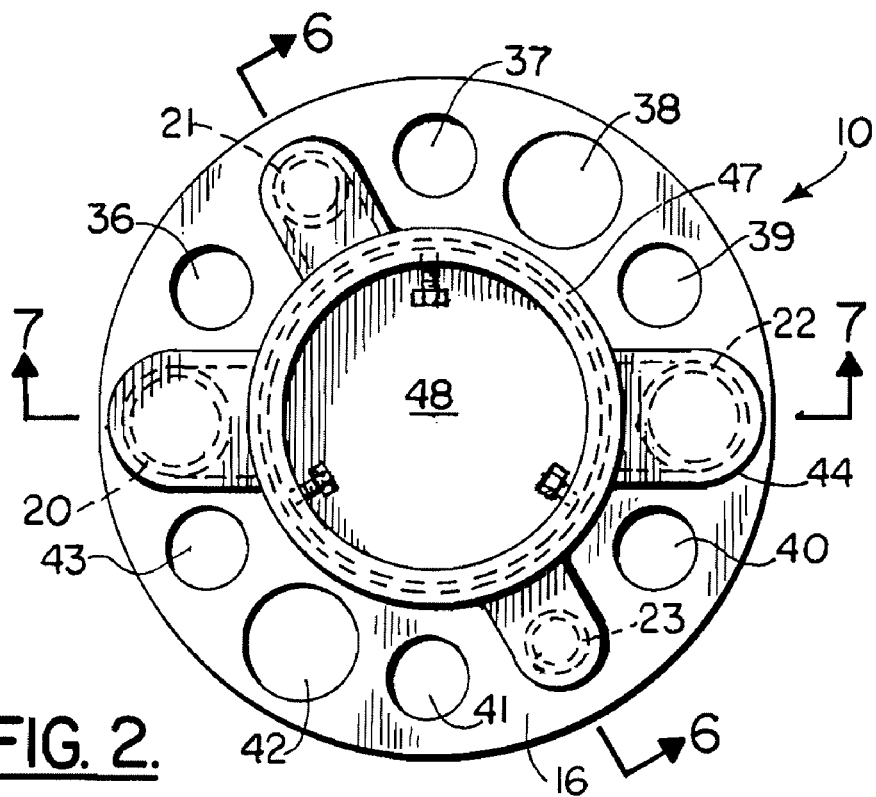
FIG. 2 is an end view of the preferred embodiment of the apparatus of the present invention.
Figure 3:
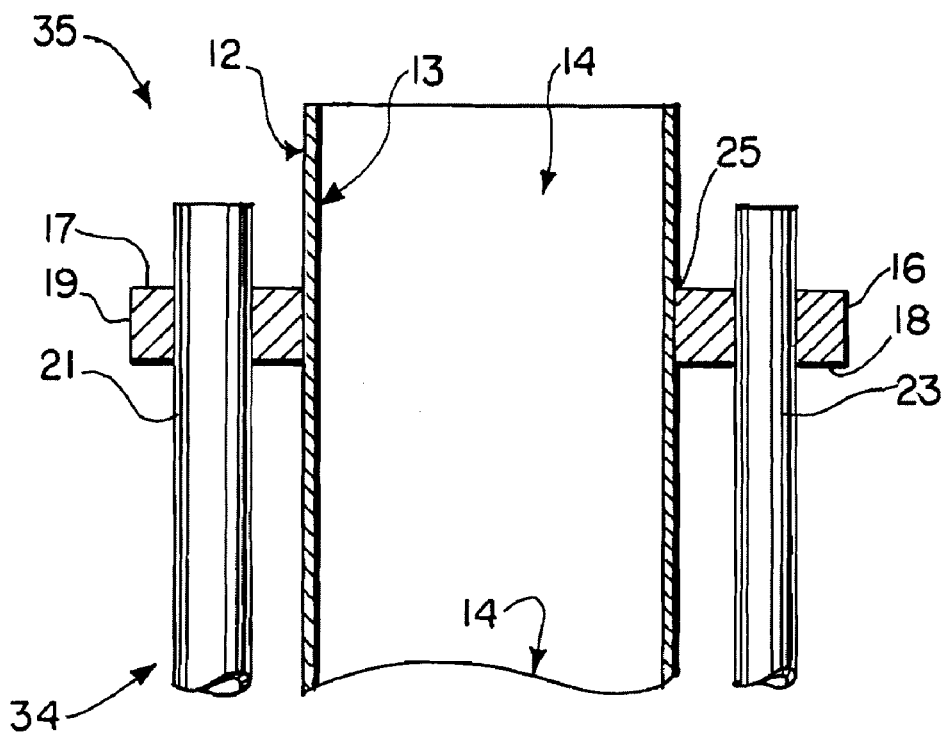
FIG. 3 is a sectional view taken along lines 3-3 of FIG. 1.
Figure 4:
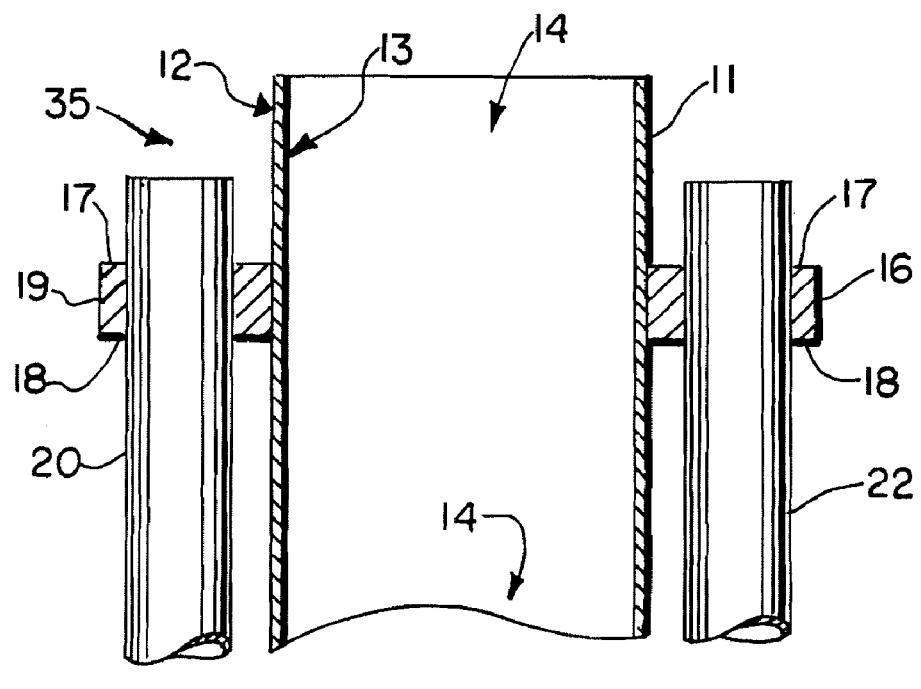
FIG. 4 is a sectional view taken along line 4-4 of FIG. 1.
Figure 5:
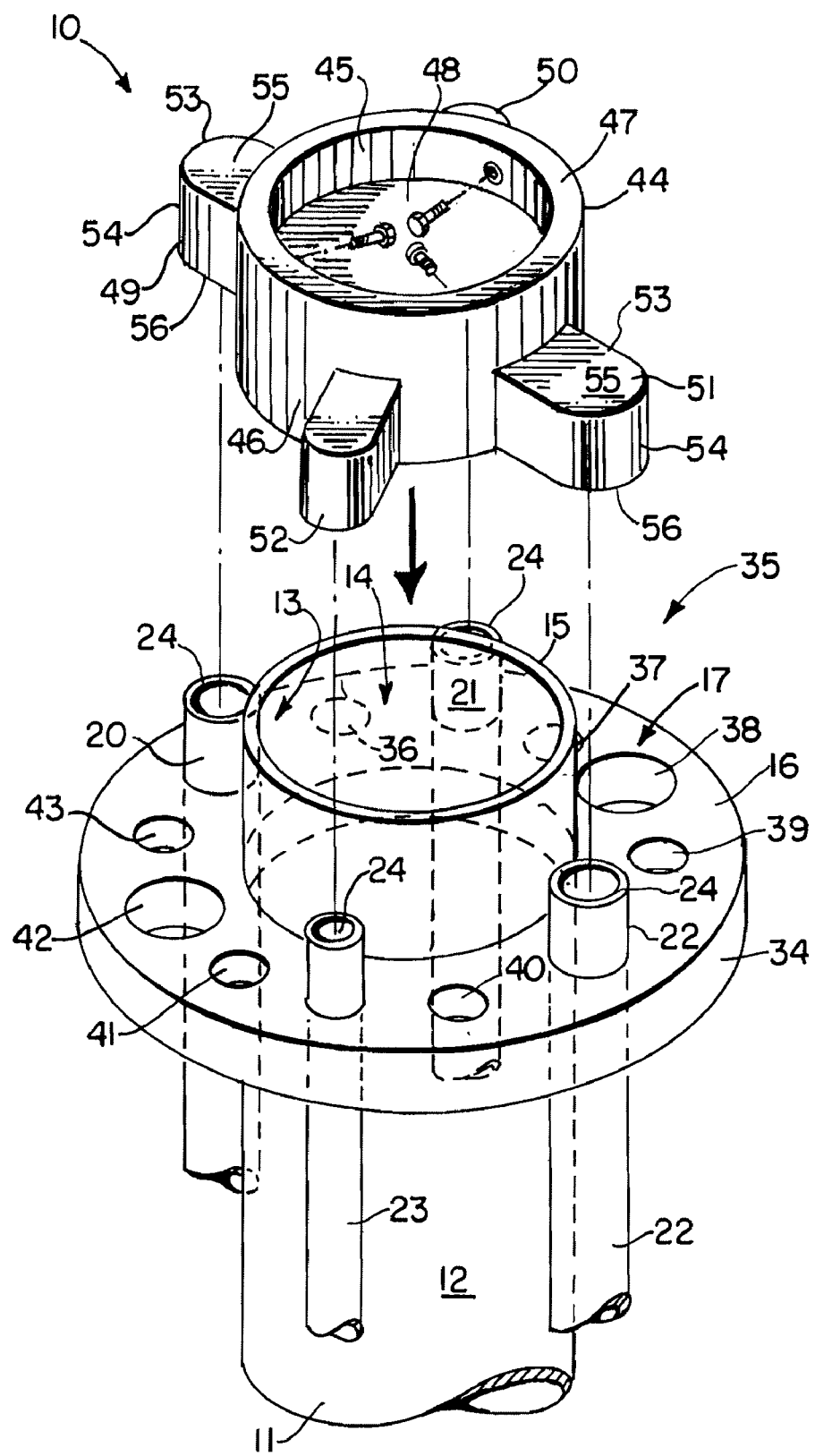
FIG. 5 is a perspective view of the preferred embodiment of the apparatus of the present invention.

In FIGS. 2, 5-8 cover 44 is comprised of an inner cylindrically shaped section 45 that is connected to an outer cylindrically shaped section 46 with a bead or an annular shoulder 47. Circular disk section 48 extends from a lower edge 49 of inner cylindrically shaped 45 to form a closure to bore 14 as shown in FIGS. 2 and 5.

Figure 6:
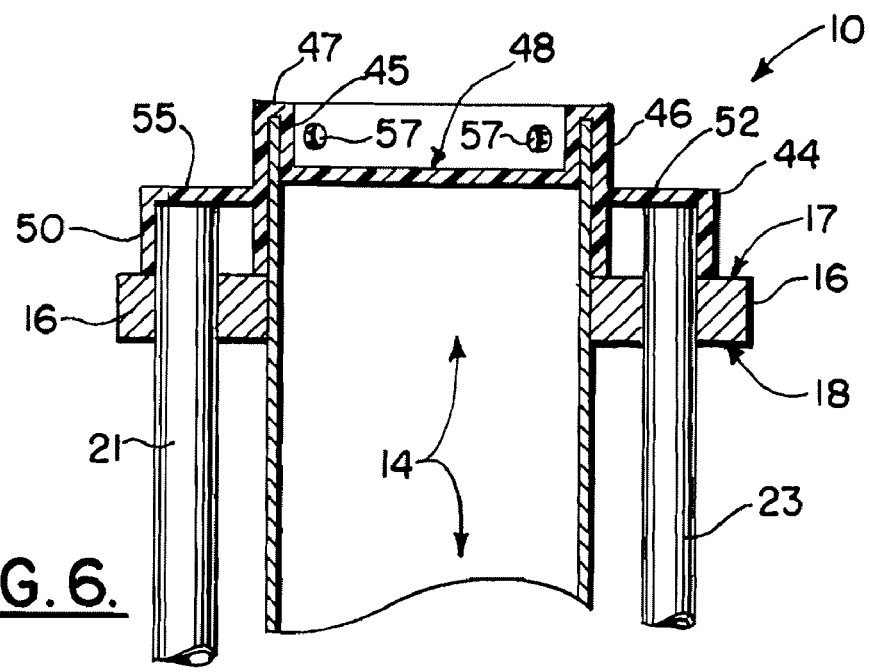
FIG. 6 is a sectional view taken along lines 6-6 of FIG. 2.
Figure 7:
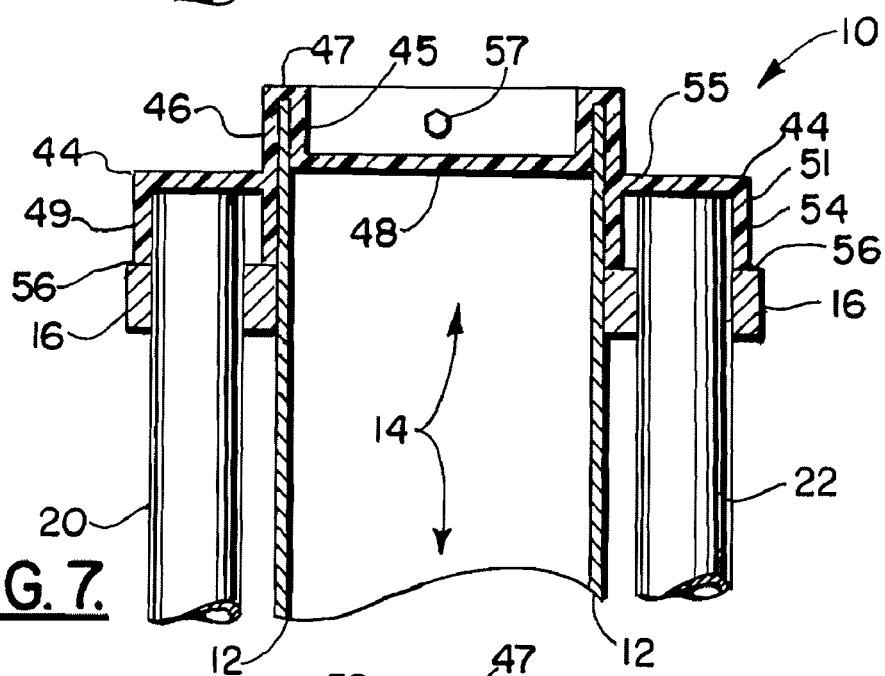
FIG. 7 is a sectional view taken along lines 7-7 of FIG. 2.

A plurality of radially extending enclosures 49, 50, 51, 52 are attached to and extend from outer cylindrically shaped section 46 of cover 44 as shown in FIGS. 5, 6 and 7. A different radially extending enclosure 49, 50, 52 is provided to protectively cover each of the small diameter pipe sections 20, 21, 22, 23. The radially extending enclosure 49 protectively covers small diameter pipe section 20 and its end portion 24. Similarly, radially extending enclosure 50 protectively covers small diameter pipe section 21, enclosure 51 covering pipe section 22, and enclosure 52 covering pipe section 23.

Each of the radially extending enclosures 49, 50, 51, 52 includes a longitudinally extending wall 54 and a transversely extending wall 55. The walls 54, 55 are joined together at connecting edge 53. Longitudinally extending wall 54 can include curved portions and has an edge 56 that engages flat face 17 of circular flange 16 during use as shown in FIGS. 6 and 7.

Figure 8:
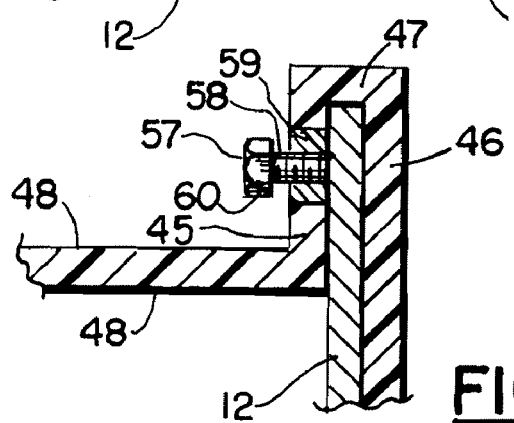
FIG. 8 is a fragmentary sectional view of the preferred embodiment of the apparatus of the present invention.

In order to secure cover 44 to the pin end 35 of riser structure 34, a plurality of set screws or bolts 57 can be provided as seen in FIGS. 6-8. Each set screw 57 can include an externally threaded portion 58, an enlarged head 60, and can form a connection with an internally threaded portion 61 of nut 59 that is embedded in inner cylindrically shaped section 45 of cover 44 (see FIG. 8). Each set screw or bolt is preferably long enough (e.g. 3-6 inches) so that the bolts 57 function as handles for enabling a worker to carry and position the apparatus 10 by gripping the bolts 57.

By manufacturing the entire cover 44 of a pliable yet tough material such as polyurethane, the cover 44 is very light and very durable. It does not dent when contacted by equipment or machinery. It enables a seal to be formed between each enclosure 49, 50, 51, 52 and flat face 17 of flange 16 as shown in FIGS. 6 and 7. It also provides a seal to the bore 14 of large diameter pipe section 11, preventing corrosive material from communicating with the bore 14 of pipe section 7 or any of the bores of the small diameter pipe sections 20, 21, 22, 23.

The following is a list of parts and materials suitable for use in the present invention.

PARTS LIST

| Part Number | Description |
| --- | --- |
| 10 | riser system |
| 11 | central large diameter pipe section |
| 12 | outer surface |
| 13 | inner surface |
| 14 | open ended bore |
| 15 | pipe end |
| 16 | circular flange |
| 17 | flat face |
| 18 | flat face |
| 19 | annular peripheral surface |
| 20 | small diameter pipe section |
| 21 | small diameter pipe section |
| 22 | small diameter pipe section |
| 23 | small diameter pipe section |
| 24 | end portion |

-continued

| Part Number | Description |
| --- | --- |
| 25 | central opening |
| 26 | peripheral opening |
| 27 | peripheral opening |
| 28 | peripheral opening |
| 29 | peripheral opening |
| 30 | bore |
| 31 | bore |
| 32 | bore |
| 33 | bore |
| 34 | riser structure |
| 35 | end |
| 36 | opening |
| 37 | opening |
| 38 | opening |
| 39 | opening |
| 40 | opening |
| 41 | opening |
| 42 | opening |
| 43 | opening |
| 44 | cover |
| 45 | inner cylindrically shaped section |
| 46 | outer cylindrically shaped section |
| 47 | annular shoulder |
| 48 | circular disk |
| 49 | radially extending enclosure |
| 50 | radially extending enclosure |
| 51 | radially extending enclosure |
| 52 | radially extending enclosure |
| 53 | connecting edge |
| 54 | longitudinally extending wall |
| 55 | transversely extending wall |
| 56 | edge |
| 57 | set screw/bolt |
| 58 | externally threaded portion |
| 59 | embedded nut |
| 60 | head |
| 61 | internally threaded portion |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A riser assembly, comprising;
  a) a central pipe having a first diameter, an inner surface, an outer surface, an open ended bore, a wall thickness and opposed ends;
  b) a plurality of peripheral pipes, each having an open ended bore and a second diameter that is smaller than the first diameter;
  c) at least one flange that joins the central pipe and peripheral pipes together to define a multi-pipe structure, said at least one flange having a central opening occupied by the central pipe and a plurality of circumferentially spaced apart peripheral openings that generally surround the central opening, at least some of said peripheral openings being occupied by a said peripheral pipe, said structure having opposed end portions, one said end portion being a pin end portion;
  d) a protective cover affixed to the central pipe, said cover being a polymeric body that includes an inner cylindrical portion that occupies a part of said open ended bore of said central pipe and being next to the inner surface of the central pipe and an outer cylindrical portion that surrounds one of said opposed ends of said central pipe, a shoulder that connects the inner and outer cylindrical portions of said polymeric body, a circular disk that is connected to the inner cylindrical surface and that occupies a position in the bore of the central pipe;
  e) said cover including a plurality of radially extending enclosures that each are connected to and extend from the outer cylindrical portion to the periphery of one of the flanges next to the pin end portion, each said enclosure comprising a longitudinally extending wall connected to the outer cylindrical portion and a transversely extending wall that is connected to the longitudinally extending wall and to the outer cylindrical portion, each enclosure having an edge that is positioned next to said next to said one of the flanges next to the pin end portion flange; and
  f) wherein each peripheral pipe has a free end that is enveloped by one of said plurality of radially extending enclosures.

2. The riser assembly of claim 1 wherein the polymeric body is of a polyurethane material.

3. The riser assembly of claim 1 wherein the inner cylindrical portion and the outer cylindrical portion each have a thickness and the thicknesses are of different dimensions.

4. The riser assembly of claim 1 wherein the inner cylindrical portion and the outer cylindrical portion each have a wall thickness, one having a wall thickness that is greater than the wall thickness of said central pipe.

5. The riser assembly of claim 1 wherein the outer cylindrical portion engages said at least one flange.

6. The riser assembly of claim 1 wherein the longitudinally extending wall engages said at least one flange.

7. The riser assembly of claim 1 wherein the enclosures have differing sizes.

8. A riser assembly comprising:
  a) a central pipe having a first diameter, an inner surface, an outer surface, an open ended bore, a wall thickness and opposed ends;
  b) a plurality of smaller diameter peripheral pipes, each having an open ended bore and a second diameter that is smaller than the first diameter;
  c) at least one flange that joins the central pipe and peripheral pipes together to define a multi-pipe structure, said at least one flange having a central opening occupied by the central pipe and a plurality of circumferentially spaced apart peripheral openings that generally surround the central opening, at least some of said peripheral openings being occupied by a said peripheral pipe, said structure having opposed end portions one said end portion being a pin end portion;
  d) a protective cover affixed to the central pipe, said cover being a polymeric body that includes an inner cylindrical portion that occupies a part of said open ended bore of said central pipe and being next to the inner surface of the central pipe and an outer cylindrical portion that surrounds one of said opposed ends of said central pipe, a shoulder that connects the inner and outer cylindrical portions of said polymeric body, a circular disk that is connected to the inner cylindrical surface and that occupies a position in the bore of the central pipe; and
  e) said cover including a plurality of radially extending enclosures that each are connected to and extend from the outer cylindrical portion to the periphery of one of the flanges next to the pin end portion, each said enclosure comprising a longitudinally extending wall connected to the outer cylindrical portion and a transversely extending wall that is connected to the longitudinally extending wall and to the outer cylindrical portion, each enclosure having an edge that is positioned next to said one of the flanges next to the pin end portion flange;

f) a plurality of fasteners that connect the inner cylindrical portion to the inner surface of the central pipe.

9. The riser assembly of claim 8 wherein said plurality of fasteners are spaced circumferentially apart.

10. The riser assembly of claim 8 wherein the inner cylindrical portion has at least one internally threaded opening and at least one of said plurality of fasteners threadably attaches to the inner cylindrical section at the internally threaded opening.

11. The riser assembly of claim 8 wherein the inner cylindrical portion has internally threaded openings and said plurality of fasteners threadably attaches to the inner cylindrical portion at the internally threaded openings.

12. A riser assembly, comprising;
a) a central pipe having a first diameter, an inner surface, an outer surface, an open ended bore, a wall thickness and opposed ends;
b) a plurality of smaller diameter peripheral pipes, each having an open ended bore and a second diameter that is smaller than the first diameter;
c) at least one flange that joins the central pipe and peripheral pipes together to define a multi-pipe structure, said at least one flange having a central opening occupied by the central pipe and a plurality of circumferentially spaced apart peripheral openings that generally surround the central opening, at least some of said peripheral openings being occupied by a said peripheral pipe, said structure having opposed end portions, one said end portion being a pin end portion;
d) a protective cover affixed to the central pipe, said cover being a polymeric body that includes an inner cylindrical portion that occupies a part of said open ended bore of said central pipe and being next to the inner surface of the central pipe and an outer cylindrical portion that surrounds one of said opposed ends of said central pipe, a shoulder that connects the inner and outer cylindrical portions of said polymeric body, a circular disk that is connected to the inner cylindrical surface and that occupies a position in the bore of the central pipe; and
e) said cover including a plurality of radially extending enclosures that each are connected to and extend from the outer cylindrical portion to the periphery of one of the flanges next to the pin end portion, each said enclosure comprising a longitudinally extending wall connected to the outer cylindrical portion and a transversely extending wall that is connected to the longitudinally extending wall and to the outer cylindrical portion, each enclosure having an edge that is positioned next to said one of the flanges next to the pin end portion flange;

wherein there is an annular space in between the inner and outer cylindrical portions that is substantially filled by a part of said central pipe.

13. A riser assembly, comprising:
a) a central pipe having a first diameter, an inner surface, an outer surface, an open ended bore, a wall thickness and opposed ends;
b) a plurality of smaller diameter peripheral pipes, each having an open ended bore and a second diameter that is smaller than the first diameter;
c) at least one flange that joins the central pipe and peripheral pipes together to define a multi-pipe structure, said at least one flange having a central opening occupied by the central pipe and a plurality of circumferentially spaced apart peripheral openings that generally surround the central opening, at least some of said peripheral openings being occupied by a said peripheral pipe, said structure having opposed end portions, one said end portion being a pin end portion;
d) a protective cover affixed to the central pipe, said cover being a polymeric body that includes an inner cylindrical portion that occupies a part of said open ended bore of said central pipe and being next to the inner surface of the central pipe and an outer cylindrical portion that surrounds one of said opposed ends of said central pipe, a shoulder that connects the inner and outer cylindrical portions of said polymeric body, a circular disk that is connected to the inner cylindrical surface and that occupies a position in the bore of the central pipe; and
e) said cover including a plurality of radially extending enclosures that each are connected to and extend from the outer cylindrical portion to the periphery of one of the flanges next to the pin end portion, each said enclosure comprising a longitudinally extending wall connected to the outer cylindrical portion and a transversely extending wall that is connected to the longitudinally extending wall and to the outer cylindrical portion, each enclosure having an edge that is positioned next to said one of the flanges next to the pin end portion flange;

wherein the longitudinally extending wall is generally U-shaped.

14. A riser assembly, comprising;
a) a centrally positioned pipe having first a diameter, an inner surface, an outer surface, an open ended bore, a wall thickness and opposed ends;
b) a plurality of peripheral pipes, each having an open ended bore and a second diameter smaller than the first diameter;
c) a generally circular disk flange that joins the central pipe and peripheral pipes together to define a multi-pipe structure, said flanges having a central opening occupied by the central pipe and a plurality of circumferentially spaced apart peripheral openings that generally surround the central opening, at least some of said peripheral openings being occupied by one of said peripheral pipes, said structure having opposed end portions, one end portion being a pin end portion;
d) a protective cover affixed to the central, pipe, said cover being a non-metallic body that includes an inner cylindrical portion that occupies a part of the open ended bore of the central pipe and being next to the inner surface and an outer cylindrical portion that surrounds one of said opposed ends of said central pipe, a shoulder that connects the inner and outer cylindrical portions of said non-metallic body, said cover including a circular disk that is connected to the inner cylindrical surface and that occupies a position in the bore of the central pipe;
e) said cover including a plurality of radially extending enclosures that extend from the outer cylindrical portion to the periphery of the flange, each said enclosure comprising a longitudinally extending wall and a transversely extending wall that are connected to each other and to the outer cylindrical portion, each enclosure having an edge that is positioned next to said flange during use; and t) a plurality of fasteners that connect the inner cylindrical portion to the inner surface of the central pipe.

15. A piping riser assembly, comprising;
a) a centrally positioned pipe having a first diameter, an inner surface, an outer surface, an open ended bore, a wall thickness and opposed ends;
b) a plurality of smaller diameter peripheral pipes, each having an open ended bore;
c) at least one flange that joins the centrally positioned and smaller peripheral pipes together to define a multi-pipe structure, each of said at least on flange having a central opening occupied by the centrally positioned pipe and a plurality of circumferentially spaced apart peripheral openings that generally surround the central opening, at least some of said peripheral openings being occupied by one of said peripheral pipes, said multi-pipe structure having opposed end portions, one end portion being a pin end portion;
d) a protective cover affixed to the centrally positioned pipe, said cover being a unitary polymeric body that includes an inner cylindrical portion that occupies a part of said open ended bore and being next to the inner surface of the centrally positioned pipe and an outer cylindrical portion that surrounds one of said opposed ends of said centrally positioned pipe, a transverse annular shoulder that connects the inner and outer cylindrical portions of said polymeric body;
e) the cover including a circular disk that is connected to the inner cylindrical surface of the centrally positioned pipe and that is spaced longitudinally from the annular shoulder and that occupies a position in the bore of the centrally positioned pipe;
f) said cover including a plurality of radially extending enclosures that each are connected to and extend from the outer cylindrical portion to a position next to the periphery of one of said at least one flange and next to the pin end portion, each said enclosure comprising a longitudinally extending wall connected to the outer cylindrical portion and a transversely extending wall that is connected to the longitudinally extending wall and to the outer cylindrical portion, each enclosure having an edge that is positioned next to said at least one flange, and
g) wherein each peripheral pipe has a free end that is enveloped by one of said radially extending enclosures.

16. The piping riser assembly of claim 15 wherein the polymeric body is of a polyurethane material.

17. The piping riser assembly of claim 15 wherein the inner cylindrical portion and the outer cylindrical portion each have a thickness and the thicknesses are of different dimensions.

18. The piping riser assembly of claim 15 wherein the inner cylindrical portion and the outer cylindrical portion each have a wall thickness, one having a wall thickness that is greater than the wall thickness of the centrally positioned pipe.

19. The piping riser assembly of claim 15 wherein the outer cylindrical portion engages one of said at least one flange.

20. The piping riser assembly of claim 15 wherein the longitudinally extending wall engages one of said at least one flange.

21. The piping riser assembly of claim 15 wherein there is an annular space in between the inner and outer cylindrical portions that is substantially filled by a part of the centrally positioned pipe.

22. The piping riser assembly of claim 15 wherein the longitudinally extending wall is generally U-shaped.

23. The piping riser assembly of claim 15 wherein the enclosures have differing sizes.

24. A piping riser assembly, comprising;
a) a central pipe having a first diameter, an inner surface, an outer surface, an open ended bore, a wall thickness and opposed ends;
b) a plurality of peripheral pipes, each having a second diameter smaller than the first diameter, each having an open ended bore;
c) at least one flange that joins the central and peripheral pipes together to define a multi-pipe structure, each of said at least one flange having a central opening occupied by the central pipe and a plurality of circumferentially spaced apart peripheral openings that generally surround the central opening, at least some of said peripheral openings being occupied by one of said peripheral pipes, said multi-pipe structure having opposed end portions, one end portion being a pin end portion;
d) a protective cover affixed to the central pipe, said cover being a unitary polymeric body that includes an inner cylindrical portion that occupies a part of said open ended bore and being next to the inner surface of the central pipe and an outer cylindrical portion that surrounds one of said opposed ends of said central pipe, a transverse annular shoulder that connects the inner and outer cylindrical portions of said polymeric body and a circular disk that is connected to the inner surface and that is spaced longitudinally from the annular shoulder and that occupies a position in the bore of the central pipe section; and
e) said cover including a plurality of radially extending enclosures that each are connected to and extend from the outer cylindrical portion to the periphery of one of the flanges next to the pin end portion, each said enclosure comprising a longitudinally extending wall connected to the outer cylindrical portion and a transversely extending wall that is connected to the longitudinally extending wall and to the outer cylindrical portion, each enclosure having an edge that is positioned next to said at least one flange;
a plurality of fasteners that connect the inner cylindrical portion to the inner surface of the central pipe.

25. The piping riser assembly of claim 24 wherein said plurality of fasteners are spaced circumferentially apart.

26. The piping riser assembly of claim 19 wherein the inner cylindrical portion has at least one internally threaded opening and one of said plurality of fasteners threadably attaches to the inner cylindrical portion at the internally threaded opening.

27. The piping riser assembly of claim 24 wherein the inner cylindrical portion has internally threaded openings and one of said plurality of fasteners threadably attaches to the inner cylindrical portion at the internally threaded openings.

28. A protective cover and pipe bundle that includes a centrally positioned pipe having a first diameter, an inner surface, an outer surface, an open ended bore, a wall thickness and opposed ends, a plurality of peripheral pipes, each having a second diameter smaller than said first diameter, an open ended bore with an internal diameter, and at least one fenenstrated generally circular disk flanges that join the centrally positioned and peripheral pipes together, comprising:

a) a protective cover affixed to the centrally positioned pipe, said cover being a non-metallic body that includes an inner cylindrical portion that occupies a part of said open ended bore and being next to the inner surface and an outer cylindrical portion that surrounds one of said opposed ends of said centrally positioned pipe, a shoulder that connects the inner and outer cylindrical portions of said non-metallic body and a circular disk that is connected to the inner surface and that occupies a position in the bore of the centrally positioned pipe section, the disk having diameter about equal to the internal diameter of the centrally positioned pipe;

b) said cover including a plurality of radially extending enclosures that extend from the outer cylindrical portion to the periphery of one of said at least one flange next to the pin end portion, each said enclosure comprising a longitudinally extending wall and a transversely extending wall that are connected to each other and to the outer cylindrical portion, each enclosure having an edge that is positioned next to said at least one a flange during use; and c) wherein each peripheral pipe has a free end that is enveloped by one of said radially extending enclosures.

\* \* \* \* \*